United States Patent
Coda et al.

(10) Patent No.: US 9,785,449 B2
(45) Date of Patent: Oct. 10, 2017

(54) CONTROL OF SOFTWARE APPLICATION FOR LEARNER RESPONSE SYSTEM

(75) Inventors: Christian Coda, Lancashire (GB);
Andrew Edwardson, Lancashire (GB);
Zak Manja, Lancashire (GB); Jason Everson, Lancashire (GB); Robert Holderness, Lancashire (GB)

(73) Assignee: Promethean Limited (GB)

( * ) Notice: Subject to any disclaimer, the term of this patent is extended or adjusted under 35 U.S.C. 154(b) by 669 days.

(21) Appl. No.: 13/348,964

(22) Filed: Jan. 12, 2012

(65) Prior Publication Data
US 2012/0258434 A1 Oct. 11, 2012

(30) Foreign Application Priority Data
Jan. 12, 2011 (GB) .................................. 1100508.9

(51) Int. Cl.
G09B 7/02 (2006.01)
G06F 9/44 (2006.01)
G06F 3/038 (2013.01)

(52) U.S. Cl.
CPC ............ *G06F 9/4443* (2013.01); *G06F 3/038* (2013.01); *G09B 7/02* (2013.01)

(58) Field of Classification Search
CPC ...................................................... G09B 7/02
USPC ............. 434/322, 323, 350, 336, 118; 725/9
See application file for complete search history.

(56) References Cited

U.S. PATENT DOCUMENTS

| | | | |
|---|---|---|---|
| 5,925,103 A * | 7/1999 | Magallanes | H04L 12/2856 709/218 |
| 2006/0088806 A1* | 4/2006 | Quinn | G06Q 50/2057 434/236 |
| 2006/0294552 A1* | 12/2006 | Swanson et al. | 725/80 |
| 2007/0016691 A1* | 1/2007 | Pepin | H04L 69/18 709/246 |
| 2007/0083512 A1* | 4/2007 | Pepin | G06F 9/44526 |
| 2009/0197238 A1* | 8/2009 | Moffatt | G09B 21/00 434/430 |
| 2011/0032562 A1* | 2/2011 | McCuen | G06F 3/1205 358/1.15 |
| 2012/0270201 A1* | 10/2012 | Cacioppo et al. | 434/351 |

OTHER PUBLICATIONS

Search Report prepared by the Great Britain Intellectual Property Office on May 6, 2011, for Great Britain Application No. GB 1100508.9.

* cited by examiner

*Primary Examiner* — Thomas Hong
(74) *Attorney, Agent, or Firm* — Brient Globerman, LLC; Kyle M. Globerman (57) ABSTRACT

There is disclosed a method, in a learner-response system comprising a computer system and a plurality of user terminals adapted to communicate with the computer system, the method comprising: providing a presentation application adapted for displaying a set of questions associated with a learner-response session via a user interface of the presentation application; providing a learner-response application adapted to be responsive to inputs received from the plurality of user terminals; wherein the method further comprises: forwarding inputs detected by the presentation application as being associated with a learner-response session to the learner-response application; processing such inputs at the learner-response application.

16 Claims, 8 Drawing Sheets

DISPLAY (a)

DATA FLOW (b)

FIG 3

DISPLAY (a)

DATA FLOW (b)

FIG 4

DISPLAY (a)

DATA FLOW (b)

Figure 5

DISPLAY (a)

DATA FLOW (b)

CONTROL OF SOFTWARE APPLICATION FOR LEARNER RESPONSE SYSTEM

BACKGROUND TO THE INVENTION

Field of the Invention

The present invention relates to the control of an application running on a computer system, and particularly for addressing a problem where a user has no or limited familiarity with the application such that their use of the application is limited or non-existent.

The present invention relates particularly, but not exclusively, to the control of a learner response software application running on a computer of a collaborative input system, where a plurality of users using remote handsets provide inputs to a computer system during a learner response session.

Description of the Prior Art

Learner response systems are well-known in the art. Typically a plurality of wireless handsets are distributed to each of a plurality of students in a classroom. The wireless handsets are adapted to communicate wirelessly with a central computer system. In advantageous arrangements, the central computer system controls the display of an electronic whiteboard. Questions are displayed on the display of the electronic whiteboard, and each student can answer the questions by entering an answer at their own handset. The answer may be selection of a multiple choice option, or provision of a specific answer using a keypad on the handset. The answers are then wirelessly transmitted to the central computer system for evaluation and storage.

In some implementations, the handsets are provided with displays for displaying information to the user. In some implementations the questions are displayed to the user using the display on the handset. This arrangement, in particular, facilitates so-called self-paced learning where a user can work through a set of questions or other exercise at their own pace.

In the art specific software applications are provided to support learner response sessions in such learner response systems, with a learner response software application running on the central computer system. The learner response software application may allow a user—such as a teacher—to set-up a customized learner-response session, by formulating or arranging questions and answers. Thereafter a user—such as a teacher—may run a learner-response session, with students providing answers at their handsets to questions displayed on a whiteboard.

Some users have confidence in using only a limited set of software applications, and are put-off from using learner-response software applications by a lack of familiarity with the software applications. Some users may not fully utilize the functionality of a learner-response software application due to lack of familiarity with the application. This is despite such users being familiar and/or confident with the use of other specific software applications.

This problem can be more broadly understood as a user being reluctant or unwilling to utilize a new software application, for the simple reason of lack of familiarity with the software application and/or the user interface.

It is an object of the present invention to address the problem of a user not utilizing, or not fully utilizing, a learner response application or learner response system due to lack of familiarity with the learner response software application, and/or the user interface of the learner response software application.

More generally it is an object of the present invention to address the problem of a user not utilizing, or not fully utilizing, a software application or software user interface due to lack of familiarity with the application or user interface.

It is an object of the present invention to provide an improved learner response system.

SUMMARY OF THE INVENTION

The invention provides a method, in a learner-response system comprising a computer system and a plurality of user terminals adapted to communicate with the computer system, the method comprising: providing a presentation application adapted for displaying a set of questions associated with a learner-response session via a user interface of the presentation application; providing a learner-response application adapted to be responsive to inputs received from the plurality of user terminals; wherein the method further comprises: forwarding inputs detected by the presentation application as being associated with a learner-response session to the learner-response application; processing such inputs at the learner-response application.

A presentation application may be an application which allows information to be presented to a user, of which Microsoft PowerPoint is an example.

The method may further comprise hiding the learner-response application from a user of the learner-response system.

The method may further comprise controlling a user interface window of the learner response application in response to inputs forwarded to the learner-response application from the presentation application.

The method may further comprise controlling a user interface window of the learner response application in response to inputs received from the remote terminals at the learner-response application.

The method may further comprise, at the learner-response application, determining an application action responsive to a received input; implementing said action in the application; and determining a user interface modification responsive to said input for the learner-response application; and updating the displayed user interface to display said modification.

The generation of any user interface window by the learner-response application may be dependent upon a state of the presentation application. The learner-response application may monitor the state of the presentation application in order to adapt the state of the learner-response application.

In determination that the presentation application is in a hidden state, any active window associated with the learner-response application may be hidden. In determination that the presentation application is in a reveal state having previously been in a hidden state, any active window associated with the learner-response system and having been previously hidden may be revealed.

The learner-response application may monitor for the display of a dialog box associated with the presentation application, and further monitors for the closure of said dialog box, and on determination of closure of an opened dialog box checks the status of the presentation application and updates its own status to reflect the status of the presentation application.

On initiation of a session to create a learner-response session or a session to run a learner-response session, the learner-response application may monitor the presentation application for the existence of a current processing thread with another application, wherein the session is initiated only if no such current processing thread is established.

The invention further provides a method, in a computer system, the method comprising: providing a first application having an associated user interface; providing a second application; wherein the method further comprises: forwarding inputs detected by the first application as being associated with the second application to the second application; processing such inputs at the second application.

The method may further comprise hiding the execution of the second application from a user of the computer system.

The method may further comprise controlling a user interface window of the second application in response to inputs forwarded to the second application from the first application.

The method may further comprise, at the second application, determining an application action responsive to a received input; implementing said action in the application; and determining a user interface modification responsive to said input for the second application; and updating the displayed user interface to display said modification.

The generation of any user interface window by the second application may be dependent upon a state of the first application.

The second application may monitor the state of the first application in order to adapt the state of the second application.

In determination that the first application is in a hidden state, any active window associated with the second application may be hidden. In determination that the first application is in a reveal state having previously been in a hidden state, any active window associated with the second application and having been previously hidden may be revealed.

The second application may monitor for the display of a dialog box associated with the first application, and further monitors for the closure of said dialog box, and on determination of closure of an opened dialog box checks the status of the first application and updates its own status to reflect the status of the first application.

On initiation of an application session associated with the second application, the second application may monitor the first application for the existence of a current processing thread with another application, wherein the session is initiated only if no such current processing thread is established.

There may be provided a computer program adapted to perform, when run on a computer, any defined method.

There may be provided a computer program product for storing computer program code which is adapted, when run on a computer, to perform any defined method.

There may be provided a computer system adapted to perform any defined method.

In an alternative there may be provided a method, in a computer system, comprising: providing an application for running on the computer system, which application is associated with a user interface for displaying information associated with the running of the application to a user, and for receiving user inputs for controlling the application; and adapting the displayed user interface: to provide a displayed user interface corresponding to a further application; and to be responsive to any given user input in accordance with a response for that user input associated with the further application.

The method of claim may further comprise: receiving a user input at the user interface; determining an application action responsive to said user input for the further application; implementing said action in the application; determining a user interface modification responsive to said user input for the further application; and updating the displayed user interface to display said modification.

The method may further comprise a plug-in application for providing the adapting steps.

The method may further comprise inhibiting the display of the application as a running task.

Adapting the user interface may further comprise displaying one or more windows associated with the running of the application, the method further comprising adapting the displayed windows to correspond to the displayed window for the same functionality in the further application.

In an alternative there may further be provided a method, in a computer system, comprising: providing a first application for running on the computer system, which first application is associated with a user interface for displaying information associated with the running of the first application to a user, and for receiving user inputs for controlling the first application; providing a second application for running on the computer system, which first application is associated with a user interface for displaying information associated with the running of the second application to a user, and for receiving user inputs for controlling the second application; adapting the first application to track the user interface of the second application; responsive to detected user inputs at the second user interface, adapting the first user interface.

BRIEF DESCRIPTION OF THE FIGURES

The invention will now be described by way of example with reference to the accompanying Figures, in which.

DESCRIPTION OF THE PREFERRED EMBODIMENTS

The invention is described herein with reference to specific examples and embodiments. The invention is not, however, limited to such examples and embodiments, and modifications to the described examples, and the broader applicability of the invention beyond the described scenarios, will be apparent to one skilled in the art.

In particular the invention is described herein with reference to a Promethean learner-response system incorporating ActiVote, ActivExpression or ActivEngage devices and applications. The invention is, however, not limited to such a specific learner-response system. Moreover the invention is not limited in its applicability to learner-response systems, as will be apparent from the following discussion.

In particular the invention is also described herein with reference to a learner-response software application which may operate in conjunction with such a Promethean learner-response system. The ActivInspire software application provided by Promethean includes functionality for supporting learner-response sessions in a learner-response system. However the invention is not limited to the use of the ActivInspire application. Moreover the invention is not limited in its applicability to learner-response applications, as will be apparent from the following discussion.

In particular the invention is still further described herein with reference to a Microsoft PowerPoint software application providing a user interface which allows, in embodiments, functionality of the ActivInspire software application to be accessed. However the invention is not limited to the use of a PowerPoint application. Moreover the invention is not limited in its applicability to any specific type of software application for allowing functionality of another software application to be accessed.

Figure 1:
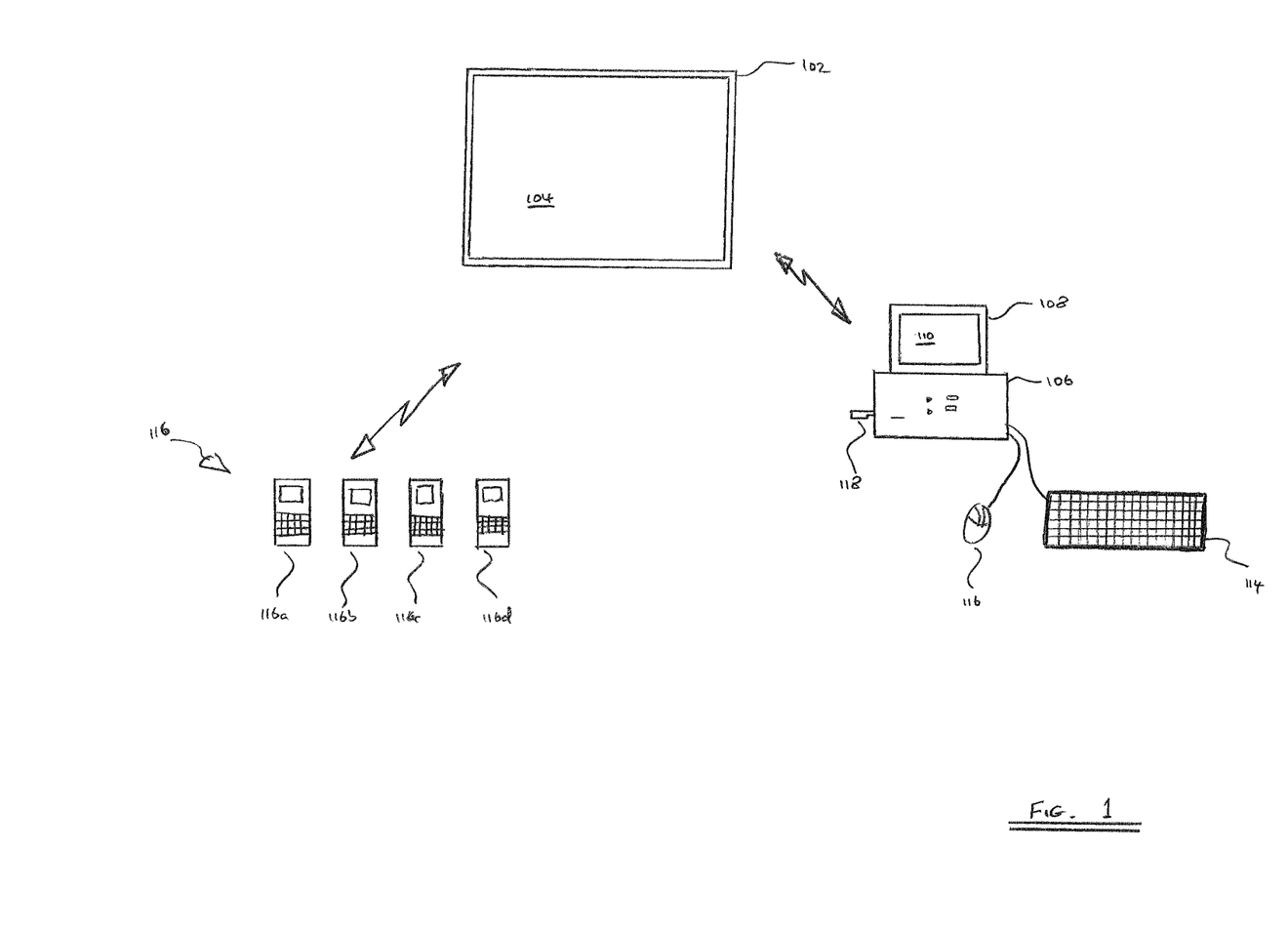
FIG. 1 illustrates an exemplary collaborative input system incorporating a learner response system.

With reference to FIG. 1, there is illustrated an exemplary environment in which the invention and its embodiments may be implemented. FIG. 1 illustrates an interactive display system incorporating a learner response system. The interactive display system includes an electronic whiteboard 102 having an interactive display surface 104; a computer 106 having a monitor 108 with a display 110, and an associated keyboard 114 and an associated mouse 116; a plurality of remote handsets 116a to 116d, generally denoted by reference numeral 116; and a system hub 118.

As known in the art, the electronic whiteboard 102 including the interactive display surface 104 is arranged such that images are displayed on the interactive display surface 104. The interactive display surface may be an emissive surface, or images may be displayed by means of a projection system (not shown). As also known in the art, the electronic whiteboard is arranged such that inputs on the interactive display surface 104, for example provided by a finger or pointing devices such as a pen, may be detected. The coordinates of such inputs can be determined to allow the finger or pointing device to manipulate the displayed images in the same way as a computer mouse may manipulate the images.

As known in the art the computer 106 runs computer software associated with applications which control the display of images on the interactive display surface 104, and which applications are controlled by the inputs detected at the interactive display surface 104. The computer system controls the display of images to the interactive display surface 104, for example by providing video signals to a projector or directly to an emissive surface, and manipulates the displayed images based on received signals representing the detected inputs at the interactive display surface.

Preferably the computer 106 and the electronic whiteboard 102 are provided with wireless communication means, such that data associated with detected inputs at the interactive display surface 104 are transmitted wirelessly to the computer 106. The computer may be connected wirelessly to drive the display of images to the interactive display surface, or for example a projector may be connected to the computer via a wire connection.

Preferably the computer 106 is provided with the communication hub 118 which provides for the wireless communication of the computer with the whiteboard. The communication hub 118 provides the wireless transceiver technology to allow for wireless communication, and runs firmware which enables the appropriate communication with the whiteboard.

In addition, the communication hub preferably provides for wireless communication between the computer 106 and the remote handsets 116. The computer may wirelessly transmit signals to the remote handsets 116, and each of the remote handsets 116 may wirelessly transmit signals to the computer 104.

The remote handsets 116 provide the learner response system capability. In an implementation, the software application running on the computer 106 is associated with a question and answer session, and questions with possible multiple choice answers are displayed on the interactive display surface 104. Each of the remote handsets 16 is allocated to and/or associated with a user (e.g. a student in a classroom environment), and each user answers the displayed questions by selecting an answer using the remote handset. The selected answers are then transmitted to the computer 106, such that the users work may be monitored. Such learner response systems are well-known in the art, and are known to be used in a variety of ways. For example question and answer sessions may be downloaded to the remote handsets such that a user may complete a question and answer session independently of the displayed information on the interactive display surface 104. As illustrated the remote handsets are provided with a display, but in other implementations no display may be provided. As illustrated the remote handset are provided with a keypad. The sophistication of the keypad, e.g. the number of buttons and/or the range of input type permitted, will differ according to implementations.

The interactive display system may be used as a conventional computer system, with the electronic whiteboard providing a display and input device for controlling a conventional computer software application. In addition the interactive display system may be used as a learner response system, in which a learner response specific software application is run on the computer system, and in which inputs are received from the remote handsets 116 during a learner response session.

Figure 2:
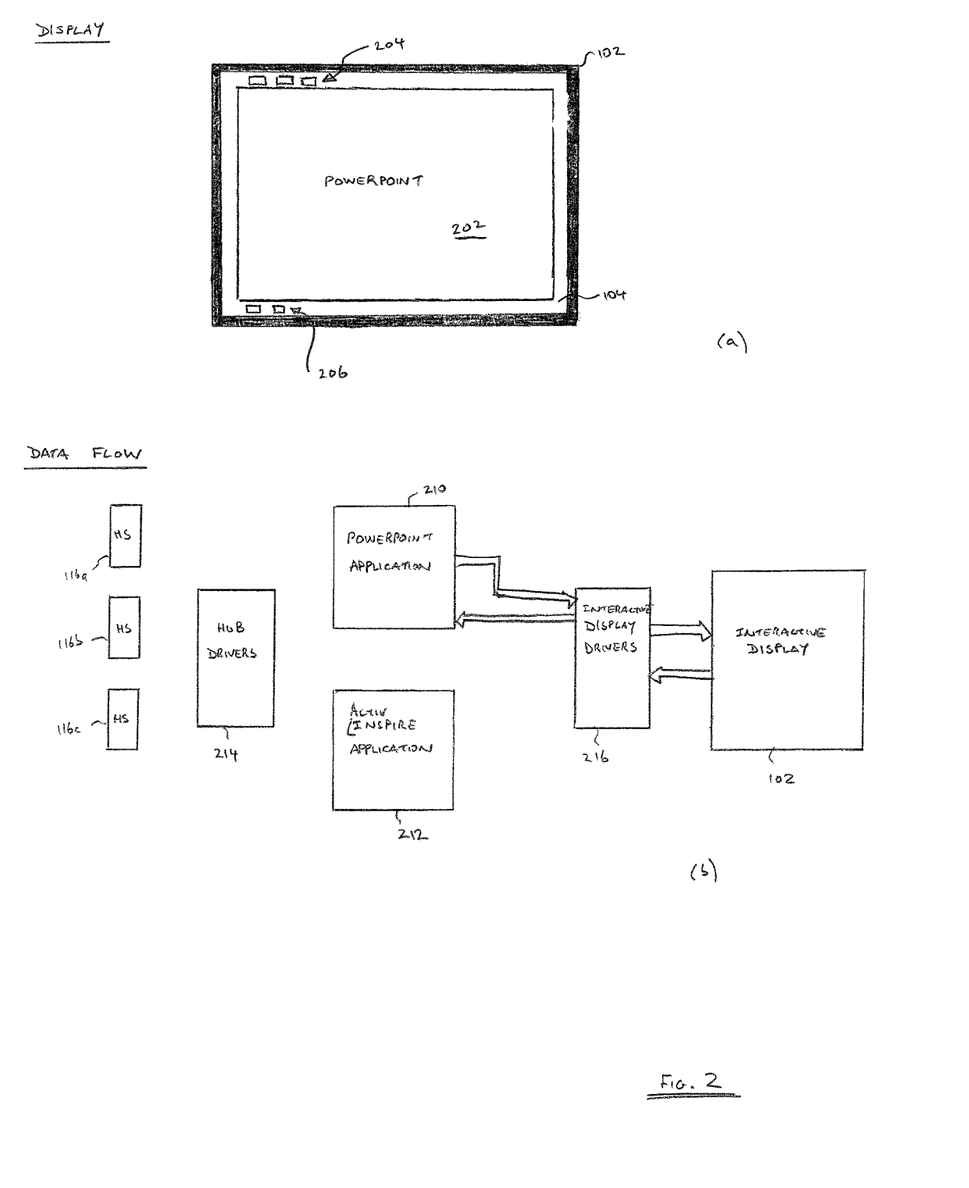
FIGS. 2a and 2b illustrate an exemplary user interface display and exemplary system data flow in a first arrangement.

FIGS. 2a and 2b illustrate the operation of a conventional software application in an interactive display system such as illustrated in FIG. 1. FIG. 2a illustrates the display displayed on the interactive display surface 104, and FIG. 2b illustrates, in high level, the flow of data between elements of the interactive display system and software applications running on the computer system of the interactive display system.

In all Figures, where a common reference numeral is used in different Figures, this represents the same element in different Figures.

FIG. 2a illustrates the electronic whiteboard 102 and interactive display surface 104, on which interactive display surface is displayed a user interface associated with a conventional software application. In the exemplary embodiment described herein, and as noted hereinabove, the conventional software application is Microsoft PowerPoint. As illustrated in FIG. 2a, the user interface for the PowerPoint application fills the interactive display surface in a conventional manner. The user interface includes a main area 202 in which content is displayed. In addition in an area at the edge of the displayed content, such as a horizontal line across the top of the display area or along the bottom of the display area, control options are displayed by way of displayed icons or buttons. In FIG. 2a there is shown a set of buttons 204 disposed horizontally along the top of the display, and a set of buttons 206 disposed horizontally along the bottom of the display. One skilled in the art will appreciate that different control options and/or buttons may be displayed in different places, dependent upon a current status of the application and default or customized configuration information for the user interface of the PowerPoint application.

In the following embodiments there is also described the implementation of a learner response software application. In the exemplary embodiment described herein, the learner response software application is, as noted above, Promethean's ActivInspire software application.

In graphical user interface (GUI) based application software, such as PowerPoint, the term 'ribbon' is used as a label for an interface where a set of toolbars are placed on tabs in a tab bar. Typically the ribbon GUI provides a user interface of an application with a large toolbar filled with graphical representations of control elements which are grouped by different functionality. The ribbon may also contain tabs to expose different sets of control elements eliminating the need for a lot of different icon-based toolbars. Some tabs may be contextual, and appear only when a certain type of object is selected, providing specific tools for items such as tables or images. In the following description the term 'ribbon' is used to convey such meaning generally.

Thus, in FIG. 2*a*, buttons 204 are provided in an upper horizontal ribbon and buttons 206 are provided in a lower horizontal ribbon, each button representing a displayed icon.

FIG. 2*b* illustrates functional elements of the interactive display system of FIG. 1, but only sufficient functional elements to illustrate the flow of data in the implementation described. For this purpose, there is illustrated a block 210 representing the PowerPoint application, a block 212 representing the Inspire application, a block 214 representing hub drivers for communicating with the remote handsets 116 and interfacing the remote handsets with the computer 106; the remote handsets 116; and a block 216 representing interactive display drivers for communicating with the electronic whiteboard 102 and interfacing the electronic whiteboard 102 with the computer 106. The PowerPoint application block 210 and the ActivInspire application block 212 are illustrated so as a representation of signal flow between these blocks and other functional elements can be presented.

When running a PowerPoint application, the flow of data is between the PowerPoint application 210 and the interactive display surface 102, via the interactive display drivers 216. Inputs detected at the interactive display surface 102 are received by the PowerPoint application 210, and the PowerPoint application 210 controls the display of the user interface in dependence on those inputs in a conventional way.

Figure 3:
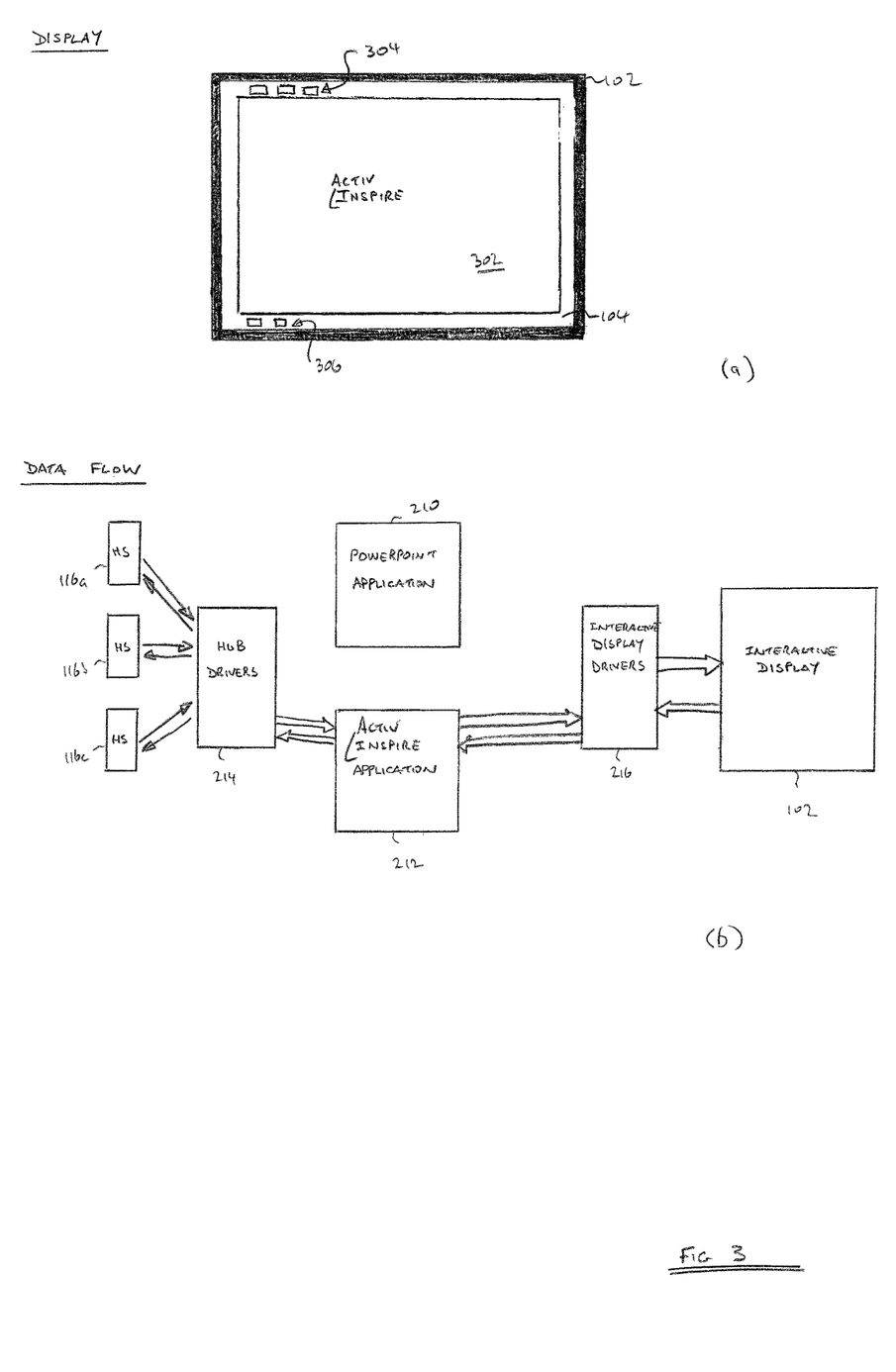
FIGS. 3a and 3b illustrate an exemplary user interface display and exemplary system data flow in a first arrangement.

FIGS. 3*a* and 3*b* illustrate the operation of the learner response software application in an interactive display system such as illustrated in FIG. 1. FIG. 3*a* illustrates the display displayed on the interactive display surface 104, and FIG. 3*b* illustrates, in high level, the flow of data between elements of the interactive display system and software applications running on the computer system of the interactive display system.

FIG. 3*a* illustrates the electronic whiteboard 102 and interactive display surface 104, on which interactive display surface is displayed a user interface associated with a learner-response software application. In the exemplary embodiment described herein, the learner response software application is Promethean's ActivInspire software application. As illustrated in FIG. 3*a*, the user interface for the ActivInspire application fills the interactive display surface in a conventional manner. The user interface includes a main area 302 in which content is displayed. In FIG. 3*a*, buttons 304 are provided in an upper horizontal ribbon and buttons 306 are provided in a lower horizontal ribbon, each button representing a displayed icon.

FIG. 3*b* illustrates functional elements of the interactive display system, but only sufficient functional elements to illustrate the flow of data in the implementation described.

When running an ActivInspire application, the flow of data is between the ActivInspire application 212 and the interactive display surface 102, via the interactive display drivers 216. Inputs detected at the interactive display surface 102 are received by the ActivInspire application 212, and the ActivInspire application 212 controls the display of the user interface in dependence on those inputs in a conventional way. In addition, the ActivInspire application 212 receives signals from the handsets 116 via the hub drivers 214, and may transmit signals to the handsets via the hub drivers 214.

A problem exists in the art that for some users who have great familiarity with a particular software package, or who perhaps have a reluctance to utilise new software applications, in that they may be deterred from fully utilizing a learner response software application such as Promethean's ActivInspire due to a lack of familiarity or reluctance. Such users may be skilled user's of other conventional software applications, such as PowerPoint, but are unable or unwilling to utilize learner response software applications, or fully utilize their capabilities.

In accordance with an embodiment of the present invention, there is therefore provided an adaptation to the interactive display system of FIG. 1, such that a user can utilise the functionality of a learner-response software application via a user interface of a conventional software application. The user experience is that of using the conventional software application, but the functionality is provided by the learner response software application.

More generally, the invention enables a user to utilize at least some functionality of a software application via a user interface of a different software application.

The operation of the interactive display system in accordance with embodiments of the invention is now further described in a preferred exemplary scenario.

Figure 4:
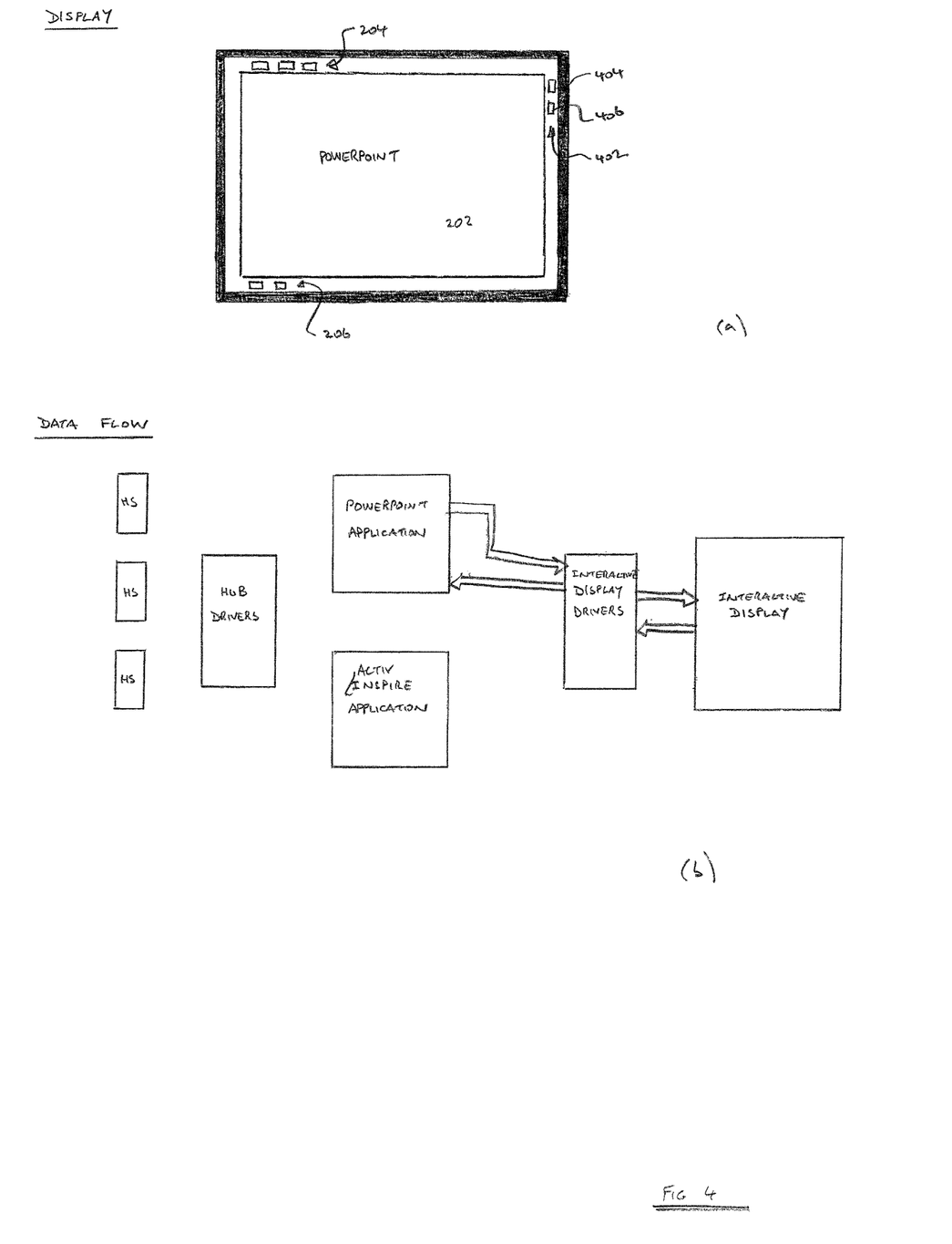
FIGS. 4a and 4b illustrate an exemplary user interface display and exemplary system data flow in a first arrangement.

FIGS. 4*a* and 4*b* illustrate the operation of the learner response software application in an interactive display system such as illustrated in FIG. 1 in a first step in accordance with an embodiment of the invention. FIG. 4*a* illustrates the display displayed on the interactive display surface 104, and FIG. 4*b* illustrates, in high level, the flow of data between elements of the interactive display system and software applications running on the computer system of the interactive display system.

FIG. 4*a* illustrates the electronic whiteboard 102 and interactive display surface 104, on which interactive display surface is displayed a user interface associated with the conventional PowerPoint software application. As illustrated in FIG. 4*a*, the user interface for the PowerPoint application fills the interactive display surface in a conventional manner. The user interface includes the main area 202 in which content is displayed. In FIG. 4*a*, buttons 204 are provided in the upper horizontal ribbon and buttons 206 are provided in the lower horizontal ribbon, each button representing a displayed icon.

In accordance with the invention, in the described embodiment the user interface of the PowerPoint application is further adapted to include a vertical ribbon on the right hand side of the main content area, including buttons denoted by reference numeral 402. Two buttons 404 and 406 in the ribbon are specifically identified.

The additional buttons provide for functionality associated with the ActivInspire software application to be triggered, although to the user of the PowerPoint application the association of these buttons with the Activ Inspire software application is not displayed or indicated in anyway. Preferably, the buttons 402 are presented with a PowerPoint 'look-and-feel', and trigger functionality which is presented in a format consistent with the PowerPoint look-and-feel, but which is actually ActivInspire functionality run under the control of the Inspire software application, as will be described further hereinbelow.

Although the additional buttons are illustrated in FIG. 4*a* as displayed on a vertical ribbon at the right hand side of the display, the additional buttons may be displayed anywhere on the display, in any arrangement.

Preferably the button 406 is associated with a function to allow for a question-and-answer session of a learner-response application to be created. The button 406 may be represented by a GUI which is indicative of the associated function, or there may be provided some other means for allowing the allocated functionality of the button to be displayed, such as displaying the functionality when a displayed cursor is moved over the button.

Referring to FIG. 4*b*, as with FIG. 2*b*, a conventional PowerPoint operation is running and communication is between the PowerPoint application and the display, similar to the arrangement illustrated in FIG. 2*b*.

Figure 5:
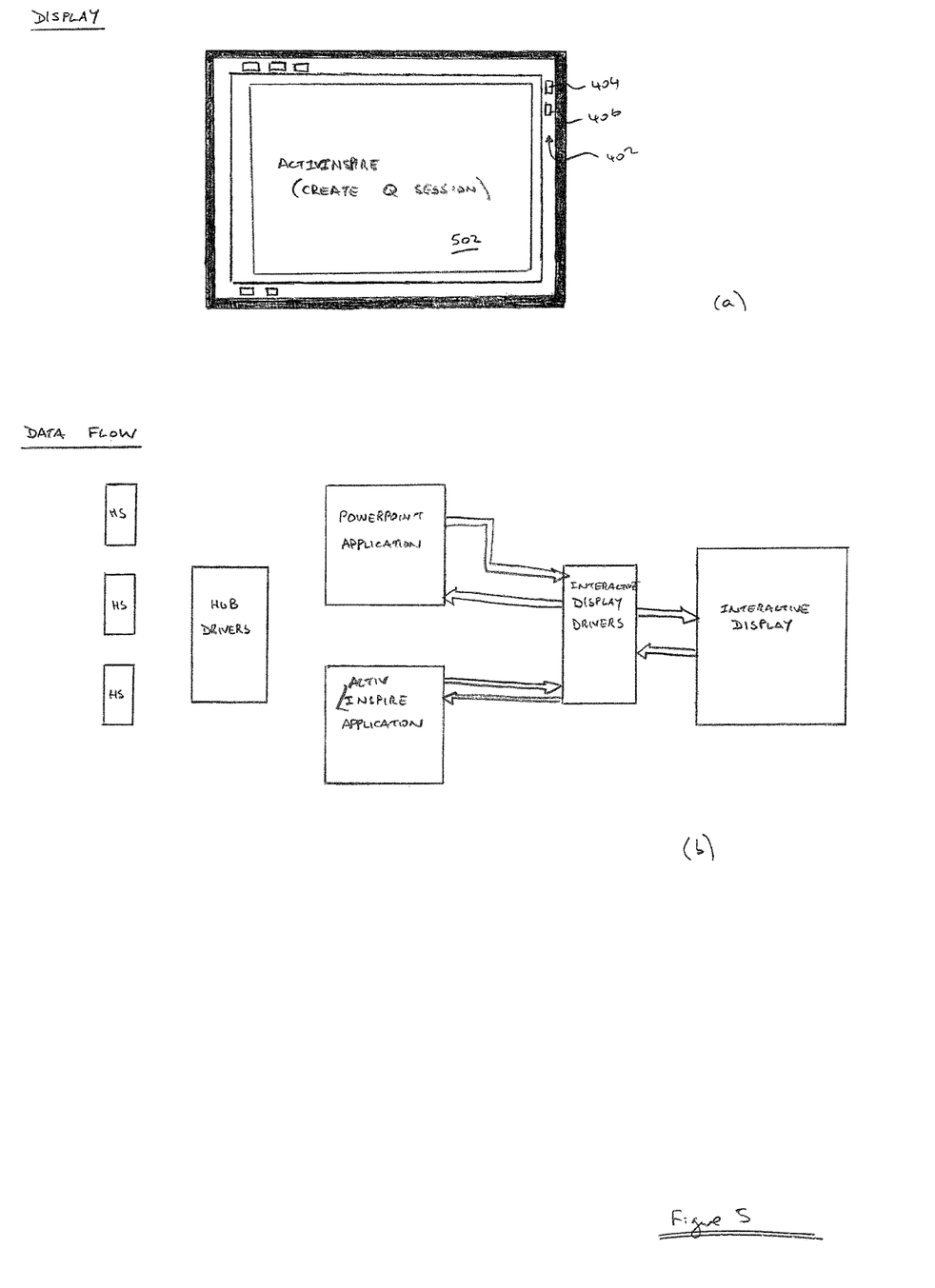
FIGS. 5a and 5b illustrate an exemplary user interface display and exemplary system data flow in a first arrangement.

Responsive to selection of the button 404, in order to initiate creation of a question-and-answer session, the displayed user interface is updated as illustrated in FIG. 5*a*. From the user's perspective, the buttons 402 represent PowerPoint functions, and functionality provided within the PowerPoint application.

As shown in FIG. 5*a*, a displayed user interface window 502 is displayed on the interactive display surface 104. This displayed user interface is generated by the ActivInspire software application, but is adapted to have the look-and-feel of the PowerPoint application. This allows the user of the system to generate a Question-and-Answer session as if they are within the PowerPoint application.

As can be seen in FIG. 5*b*, the provision of the buttons 402 results in there being communication between both the PowerPoint application and the ActivInspire application and the interactive display. When the button 404 is selected, this results in a control signal being sent to the Inspire software application such that the Inspire software application generates the user interface 502 of FIG. 5*a*.

In one arrangement the PowerPoint application first processes an input generated as a result of selection of the button 406, to determine what action to take. Thus on selection of the button 404 a signal may be sent to the PowerPoint application, and thereafter that signal may be forwarded to the ActivInspire application. This may be achieved by the PowerPoint application returning the signal to the Interactive display drivers for delivery to the ActivInspire application. Alternatively the signal may be received directly by the ActivInspire application.

Thus the signal resulting from the selection of the button 404 may result in a signal being sent directly to the Inspire application, or alternatively the signal may be sent to the PowerPoint application, and the PowerPoint application may be adapted to process such signal and forward it to the Inspire application. However, preferably the signal is sent directly to the Inspire application, as this then requires no modification of the PowerPoint application.

After the user completes the generation of the Question-and-Answer session, the user selects the button 406. A signal is then sent to the ActivInspire application in a similar way and the thus generated Question-and-Answer session is then saved.

The Question-and-Answer session is preferably saved in a PowerPoint format, and the ActivInspire application may transmit the generated data to the PowerPoint application. The data of the generated question-and-answer session is preferably generated in a PowerPoint format to maintain the presentation to the user that the data is generated using the PowerPoint application.

Once the question-and-answer session is created, it may be saved for future use or the question-and-answer session may be initiated immediately. The data is saved as PowerPoint data, and thus when the question-and-answer session is run it is run as a PowerPoint slide show.

The saving of the question-and-answer session may be achieved, in one arrangement, by selecting a save option within the conventional PowerPoint user interface, rather than by selection of a special button in the ribbon. Similarly the question-and-answer session may be created by selecting an option within another PowerPoint menu, rather than by providing a specific ribbon button.

Figure 6:
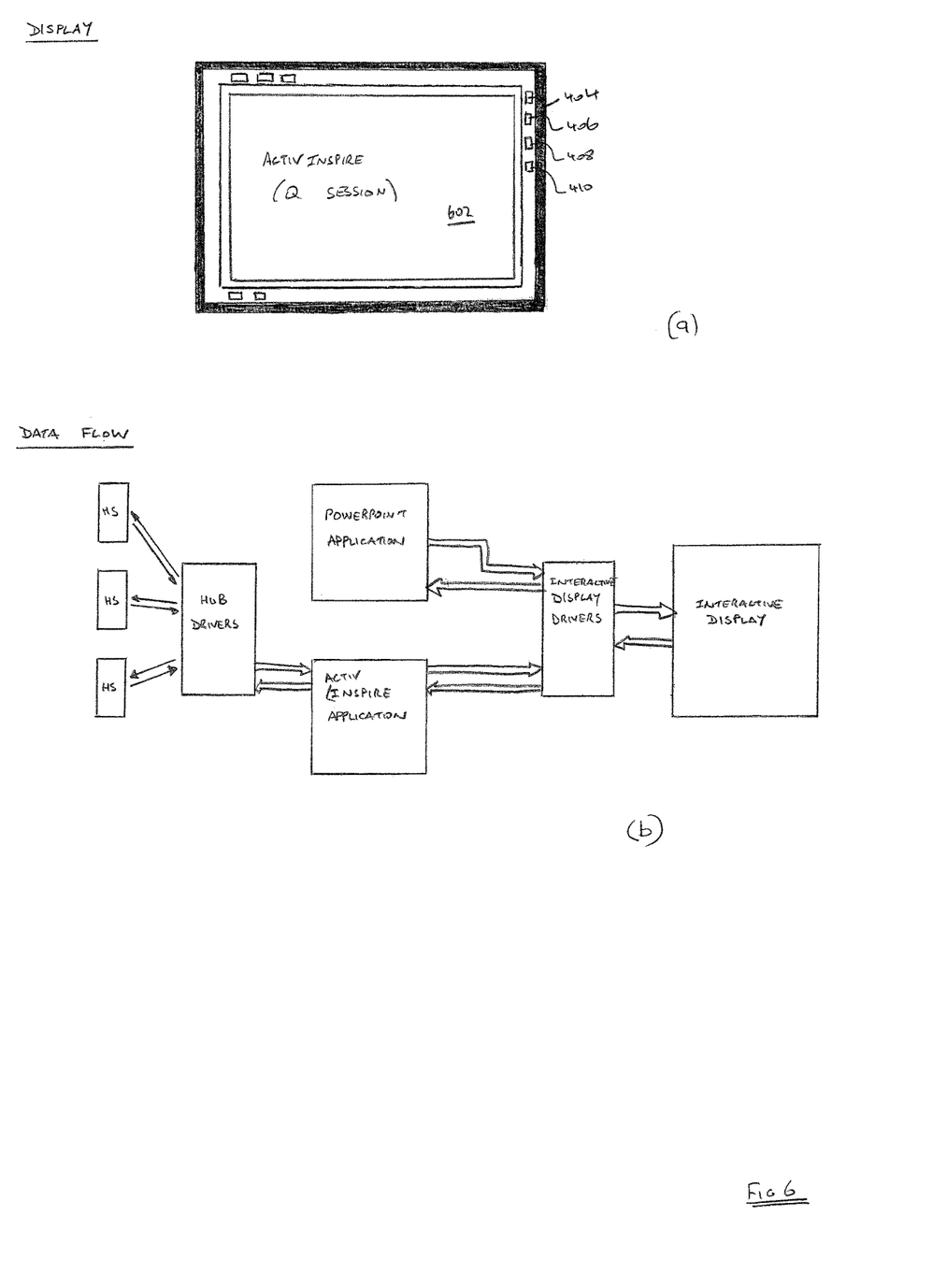
FIGS. 6a and 6b illustrate an exemplary user interface display and exemplary system data flow in a first arrangement.

Thereafter, the user may choose to implement a Question-and-Answer session. To do so, the user may select a button 408 shown in FIG. 6*a*. Alternatively the user may select an option within a PowerPoint menu. As a result a signal is sent to the ActivInspire application in order to trigger the session. As illustrated in FIG. 6*a*, a user interface 602 is displayed associated with the session. During the session, the ActivInspire application receives inputs from the handsets 116 as well as the interactive display surface 104.

From the foregoing it will be apparent that ActivInspire functionality is triggered via the PowerPoint user interface. Whilst this is done by way of providing additional buttons on the PowerPoint ribbon for generating learner-response functions, this is only exemplary and options within the PowerPoint menu may be provided. For example, a user may open a PowerPoint slide show in the usual way, and an additional button is used to start a voting session and trigger the hidden functionality of ActivInspire.

Whilst for signals intended for ActivInspire it is preferable that those signals go directly to the ActivInspire application, in practice the PowerPoint application may be adapted to direct those signals to the ActivInspire application, as the inputs are received at the PowerPoint user interface and are therefore initially processed by the PowerPoint application before being forwarded to the ActivInspire application.

The ActivInspire software application thus runs in the background, with the PowerPoint application running in the foreground. Preferably the user interface is adapted such that there is no indication that both applications are running. The ActivInspire process is hidden from the user, and the ActivInspire application is inhibited from appearing in the task bar as an application in the task manager. The ActivInspire application integrates seamlessly into the PowerPoint application, such that to the user only PowerPoint appears to be running.

In order to achieve seamless integration of the ActivInspire application into the PowerPoint application, preferably certain implementation difficulties are addressed and overcome. These difficulties, and the preferred solutions to overcome them, are now discussed. These are directed to addressing certain problems associated with a PowerPoint application, and for other applications the same or different problems may arise, or no such problems may arise. The invention is not limited, in its applicability, to providing these solutions and embodiments of the invention may be implemented without these solutions.

A first problem to be preferably addressed in achieving the seamless integration of the ActivInspire application into PowerPoint is the parenting of dialogs. In a GUI, a dialog box is a type of window used to enable reciprocal communication or "dialog" between a computer and its user. It may communicate information to the user, prompt the user for a response, or both. A dialog box is most often used to provide the user with the means for specifying how to implement a command, or to respond to a question or an "alert".

For example, dependent upon an operation currently in process, a user may have a dialog box open that is an ActivInspire dialog box (i.e. is controlled by ActivInspire), although to the user it appears to be a PowerPoint dialog box. If the user minimizes the PowerPoint application, then any dialog box associated with PowerPoint should disappear. When the user restores the PowerPoint window, the dialog box should then reappear. However in this example the dialog box is in fact controlled by ActivInspire, and can therefore only disappear and reappear under control of ActivInspire, and not PowerPoint.

Another example where this problem arises is if the user switches to another application using an "alt-tab" shortcut. Any window associated with ActivInspire will disappear, but when the user switches back to PowerPoint using the "alt-tab" shortcut, the ActivInspire-controlled window needs to reappear as well.

In accordance with a preferred embodiment of the invention, the interactive display system is adapted such that it appears to the user as if any ActivInspire dialog boxes are owned by PowerPoint, and any ActivInspire dialog boxes disappear and reappear in accordance with the expected behaviour of PowerPoint as if they are owned by PowerPoint.

In order to achieve this behaviour, the ActivInspire software application is adapted to track whether or not the PowerPoint application has window focus on any of its windows. Putting the known information about the status of ActivInspire being the hidden active program or not, together with the known information about the PowerPoint software application windows, allows a combined value to be generated to express whether or not the pair of programs is active.

When, in the combined activity state, changes occur from active to hidden, or from hidden to active, events are preferably transmitted to the GUI elements of the ActivInspire software application. These events are a variation in hide and show events. The GUI elements which respond to them must only take action if they would normally be visible.

An example of this is were a user opens the ActivInspire applications 'settings' dialog box which is displayed over the top of PowerPoint, although the user does not know that the dialog box is generated by ActivInspire. The user then switches programs to, for example, Outlook before switching back to PowerPoint. In this example the ActivInspire application 'settings' dialog box receives a custom 'everything hide' message, recognizes that it is currently visible, and changes its state to 'hidden'. It also stores the fact that it has been hidden by a custom event. Later, a custom message 'everything appear' is received by the settings dialog box. It recognizes that because it has previously been hidden by a custom event, it should change its state to visible, and resets the mechanism which tracked this fact.

Figure 7:
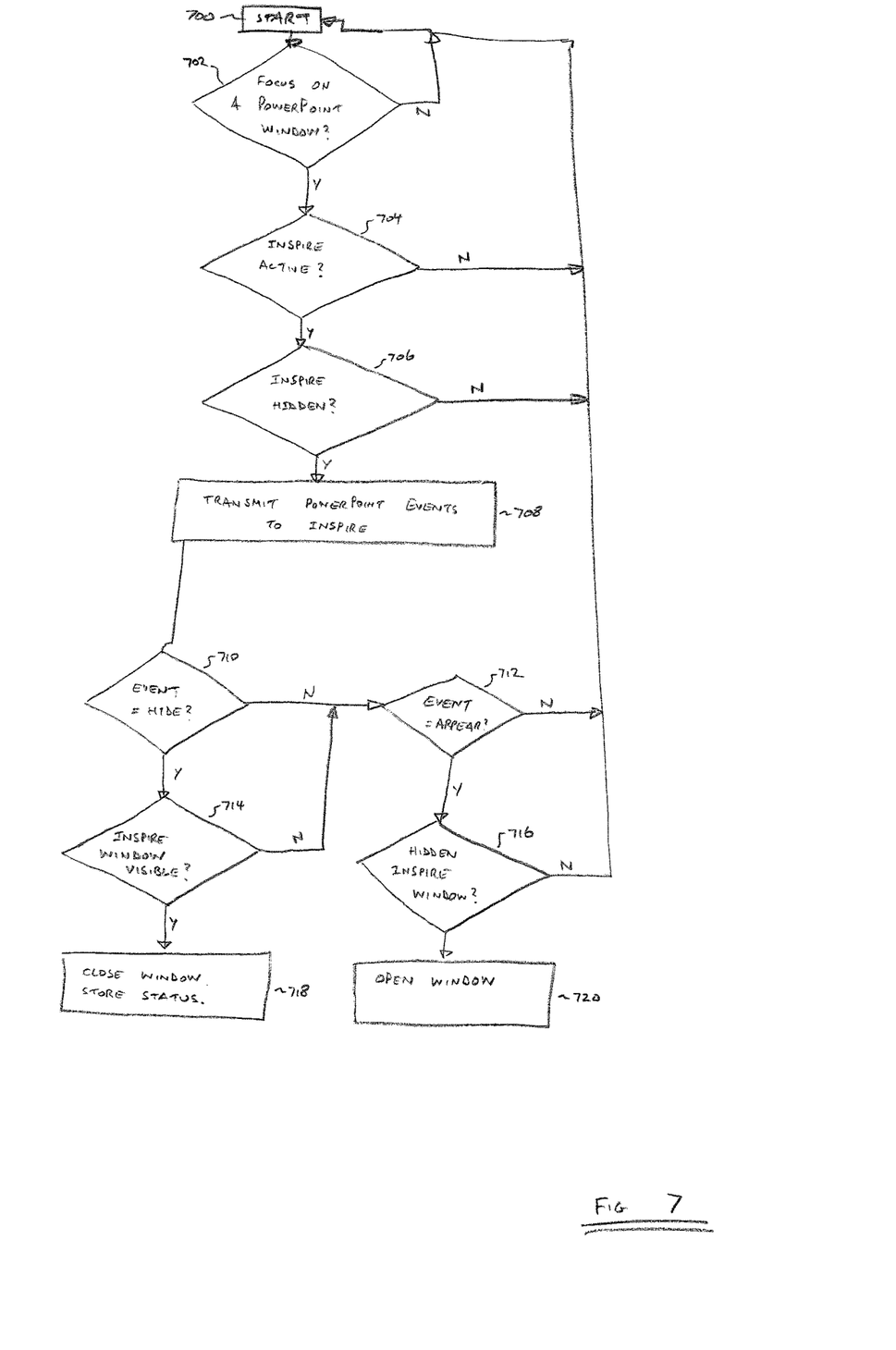
FIG. 7 illustrates a flow process for an embodiment of the invention.

This example can be further understood with reference to FIG. 7. Following start of the process in step 700, a determination is made as to whether a PowerPoint application currently has focus on the computer system in step 702. If a PowerPoint window does have focus, then in step 704 it is determined within the computer as to whether ActivInspire is an active application. If ActivInspire is active, then in a step 706 it is determined whether ActivInspire is a 'hidden' application, not visible to the user as discussed above. If ActivInspire is active and hidden then the process moves on to step 708. If in any of steps 702, 704 and 706 a negative determination is made, then the method reverts to step 700.

In step 708, the details of the PowerPoint 'event' are transmitted to the ActivInspire application. The event is preferably transmitted by PowerPoint to ActivInspire.

In a step 710 it is then determined if the event is a 'hide' event. If the event is a hide event, then in step 714 it is determined if an ActivInspire window is visible. If an ActivInspire window is visible then in step 718 that window is closed, and a status stored to indicate that the window was previously visible. If an ActivInspire window is not determined to be visible in step 714, or the event is determined not to be a hide event in step 710, then the process moves on to step 712.

In step 712 it is determined if the event is an 'appear' event. If the event is an appear event, then in step 716 it is determined whether there are any ActivInspire windows that are hidden, having previously been open, following a hide event (such as following step 718). If such a window is identified, then in step 720 that window is opened. If such a window is not identified, or if it is determined in step 712 that the event is not an appear event, then the process reverts to step 700.

ActivInspire can receive all notifications that PowerPoint generates to add-ins. An add-in is a component that can enhance the functionality of another device to increase its capabilities, or a software program that extends the functionality of another software program. However a second problem to be preferably addressed in achieving the seamless integration of the Inspire application into PowerPoint is that PowerPoint supplies only a minimal set of notifications to add-ins.

In order to overcome this problem the interactive display system is adapted so that notifications can be inferred in certain instances.

This second problem can be understood with reference to a specific example. Microsoft Office 2007 only gives a notification to plug-ins that a user has selected to close a presentation, rather than also notifying plug-ins when a presentation has actually closed. This issue is rectified in Microsoft Office 2010, but, to support Microsoft Office 2007, an adaptation is necessary.

In PowerPoint, when a close request event is detected, a modal dialog is displayed by PowerPoint to ask the user whether they want to either: i) save pending changes; ii) discard pending changes; or iii) cancel the request to close. PowerPoint generates a notification that the close request has been generated, but does not generate a notification to indicate which of options i), ii), or iii) is chosen by the user following the display of the dialog box. Thus ActivInspire does not receive a notification to confirm the additional action that takes place following a close request that generates such a dialog box.

A solution to this problem is preferably provided by adapting the ActivInspire application to check for the presence of a dialog box. Windows maintains a list of all currently active windows, and ActivInspire is adapted to check that list to determine if it includes a PowerPoint dialog box window. In the event that a PowerPoint dialog window is detected as present, Inspire continues to track the Windows list of currently active windows until it is detected that the dialog box is no longer active. Determination that the dialog box is no longer active means that an action has been taken to close the dialog box. ActivInspire then checks the status of PowerPoint in order to determine the action that was taken responsive to the dialog box, and takes any corresponding action with the associated ActivInspire windows.

Thus ActivInspire is adapted to detect that a dialog box has appeared and then closed, and then to determine the state of PowerPoint thereafter.

ActivInspire preferably tracks the state that PowerPoint is in when a user starts a presentation or starts a question-and-answer session.

Figure 8:
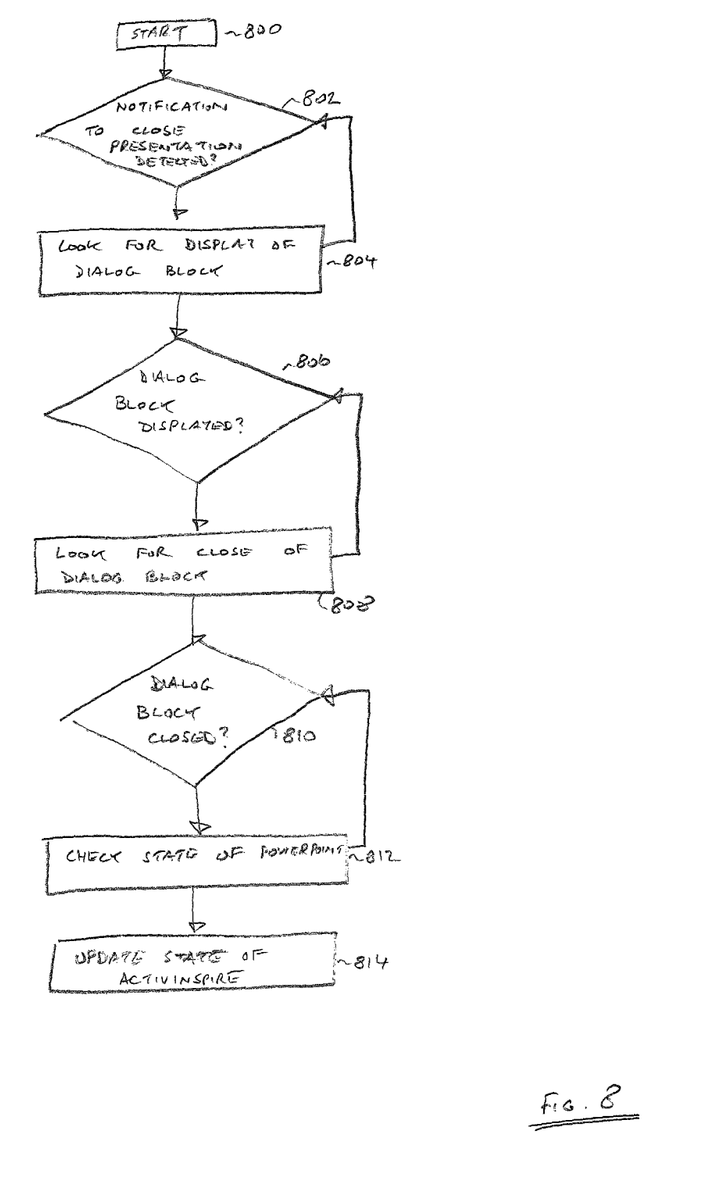
FIG. 8 illustrates a flow process for an embodiment of the invention.

This example can be further understood with reference to FIG. 8. Following start of the process in step 800, a determination is made as to whether a notification to close a presentation has been detected in step 802. If no such notification is detected, then the process reverts to step 800.

If such a notification is detected, then in step 804 ActivInspire looks for detection of display of a dialog box in step 804. In step 806 it is determined whether a dialog box is displayed. If a dialog box is not displayed then the process is retained in step 804.

If a dialog box is displayed, then in step 808 ActivInspire looks for detection of closure of the dialog box. In step 810 it is determined whether a dialog box is displayed. If a dialog box is not displayed then the process is retained in step 808.

If a dialog box is closed, then in step 812 it is detected what the resulting state of PowerPoint is. In step 814 ActivInspire is similarly updated. Thus if the state of PowerPoint indicates that the state is 'save pending changes', then ActivInspire acts accordingly and switches to this state.

An alternative solution to this problem is for Inspire to test for the display of a dialog window by periodically attempting to invalidate some user interface from another thread. Such an attempt to invalidate while the main thread has a lock on the user interface resources (through the dialog window) results in an exception being thrown. The exception will provide information of the status of the PowerPoint application. Once the attempt to invalidate the user interface is successful, it is implied that all dialog windows have been closed, and the ActivInspire application can then check the PowerPoint data model to determine what action the user selected, i.e. to detect the current status of the PowerPoint application.

A third problem to be preferably addressed in achieving the seamless integration of the ActivInspire application into PowerPoint is that for notifications from a utility library used by a plug-in, notifications are issued from a separate thread than the thread used by the ActivInspire application. Often, both the PowerPoint data model and the utility library will need to be manipulated in response to a call-back. A callback is a reference to executable code, or a piece of executable code, that is passed as an argument to other code. This allows a lower-level software layer to call a subroutine (or function) defined in a higher-level layer.

The PowerPoint data model will throw exceptions if it is in use by another thread (e.g. the main thread) at the time of the call-back. The utility library only reliably supports requests from a single thread.

Thus when a PowerPoint processing thread is already in existence, for example because a plug-in has established a processing thread with the PowerPoint application, it is undesirable for another plug-in or application—such as ActivInspire—to establish another processing thread with the PowerPoint application. Thus when an existing processing thread is established, it is preferable for the ActivInspire application to wait until that thread is terminated before establishing its own processing thread. Similarly once the ActivInspire application has established a processing thread with the PowerPoint application, then any other application or plug-in should similarly not attempt to establish a processing thread with the PowerPoint application.

Thus the ActivInspire application is preferably adapted to allow for detection of an existing processing thread, and where detected to allow for and await detection of completion/termination of said processing thread before establishing a processing thread with the PowerPoint application. This process is preferably implemented each time a question-and-answer session is created, and each time a question-and-answer session is initiated, as an initial process.

To cause all plug-in activity to be visible in the same thread as PowerPoint, an invisible user interface component is preferably created on plug-in initialisation, which occurs in the main processing thread. A handle to this user interface component is then used to pass requests from call-back threads for execution in the main thread.

The ActivInspire application only tracks one thread, but relies upon the PowerPoint data model generating exceptions on the thread being monitored. The exceptions have to be generated on that thread because the PowerPoint library only supports requests for a single thread. The information in those exceptions is then used to determine what to do.

The PowerPoint thread is accessed to see whether other threads are accessing PowerPoint. Once the ActivInspire application has access to the data, then no other threads have access to the data, in a similar way.

The invisible user interface component is a way of forcing things onto a single thread. In effect the ActivInspire application polls the PowerPoint application, and if it is in use by another thread, the ActivInspire application waits until it is free again.

This is all about knowing that other threads are doing something, and waiting until those threads are finished before the ActivInspire application does something.

The invention is described herein in the context of an PowerPoint application and an Inspire application providing for operation in a learner response system. Whilst such a described arrangement is advantageous, the invention is not limited to use of such specific applications, and in general is applicable to the operation of any two applications, where the operation of one application is hidden such that the user appears only to be using one application.

The invention is described herein in the context of this application to a computer system forming part of an interactive display system. It will be understood by one skilled in the art that the principles of the invention, and the embodiments described herein, are not limited to any specific interactive display system. Moreover, the invention is not limited to application in association with an interactive display system. The principles of the invention and its embodiments may be implemented in any device having an interactive surface, whether or not that interactive surface is coincident with a display.

The invention has been described by way of reference to particular examples and exemplary embodiments. One skilled in the art will appreciate that the invention is not limited to the details of the specific examples and exemplary embodiments set forth. Numerous other embodiments may be envisaged without departing from the scope of the invention, which is defined by the appended claims.

What is claimed is:

1. A computer-implemented method, in a learner-response system comprising a computer system and a plurality of user terminals adapted to communicate with the computer system via a communication hub, the computer system comprising a computer, the computer being configured to run a first application being a presentation application and to run a second application being a learner-response application, comprising the in the computer system, of:
- establishing a communication link between the presentation application and the learner-response application;
- establishing a set of questions associated with a learner-response session executed by the learner-response application;
- displaying, on a display of the computer system, the set of questions, the display of questions being executed by the presentation application;
- receiving inputs from the plurality of user terminals by the computer system via the communication hub;
- detecting, by the presentation application running on the computer system, the received inputs;
- identifying, by the presentation application running on the computer system, the inputs as being associated with the learner-response session;
- forwarding the received inputs, by the presentation application running on the computer system, to the learner-response application running on the computer system;
- processing the received inputs by the learner-response application running on the computer system;
- in dependence on a window of the presentation application having focus and the learner-response application being active and hidden;
- receiving a presentation application triggered event at the learner-response application;
- in dependence on the presentation application event being a hide event, closing any visible window of the learner-response application; and
- in dependence on the presentation application event being an appear event, opening any previously hidden window of the learner-response application.

2. The computer-implemented method of claim 1 wherein the method further comprises hiding the learner-response application from a user of the learner-response system.

3. The computer-implemented method of claim 1 further comprising controlling a user interface window of the learner response application in response to inputs forwarded to the learner-response application from the presentation application.

4. The computer-implemented method of claim 1 further comprising controlling a user interface window of the learner response application in response to inputs received from the remote terminals at the learner-response application.

5. The computer-implemented method of claim 2 wherein any background application receiving data from the interactive display surface is maintained as a background application.

6. The computer-implemented method of claim 1 wherein the generation of any user interface window by the learner-response application is dependent upon a state of the presentation application, wherein the learner-response application monitors the state of the presentation application in order to adapt the state of the learner-response application wherein in determination that the presentation application is in a hidden state, any active window associated with the learner-response application is hidden, wherein in determination that the presentation application is in a reveal state having previously been in a hidden state, any active window associated with the learner-response system and having been previously hidden is revealed.

7. The computer-implemented method of claim 1 wherein the second application monitors for the display of a dialog box associated with the first application, and further monitors for the closure of said dialog box, and on determination of closure of an opened dialog box checks the status of the first application and updates its own status to reflect the status of the first application.

8. The computer-implemented method of claim 1 wherein on initiation of an application session associated with the second application, the second application monitors the first application for the existence of a current processing thread with another application, wherein the session is initiated only if no such current processing thread is established.

9. The computer-implemented method of claim 1 further comprising, on closure of the window following a hide event, updating a status store to indicate that the closed window was previously visible.

10. The computer-implemented method of claim 1 further comprising, on receipt of an appear event at the learner-response application, determining whether any window of the learner-response application has previously been hidden following a hide event.

11. A learner-response system comprising a computer system and a plurality of user terminals adapted to communicate with the computer system, the computer system comprising a computer, the computer configured to run a first application being a presentation application and to run a second application being a learner-response application, the learner-response system comprising:
- a communication link between the presentation application and the learner-response application;
- a set of questions associated with a learner-response session executed by the learner-response application;
- a display of the computer system, configured to display the set of questions, the display of questions being executed by the presentation application;
- an interface configured to receive inputs from the plurality of user terminals at the computer system via the communication hub;
- wherein the presentation application is configured to
- detect the received inputs,
- identify the received inputs as being associated with the learner-response session, and forward the received inputs identified as being associated with a learner-response session to the learner-response application running on the computer system; and
- wherein
- the leaner-response application is configured to process such inputs; and
- in dependence on a window of the presentation application having focus and the learner-response application being active and hidden, wherein a presentation application triggered event is received at the learner-response application;
- in dependence on the presentation application event being a hide event the presentation application is configured to close any visible window of the learner-response application;
- in dependence of the presentation application event being an appear event, the presentation application is configured to open any previously hidden window of the learner-response application.

12. The learner-response system of claim 11 wherein further comprising means for hiding the learner-response application from a user of the learner-response system.

13. The learner response system of claim 12 further comprising means for controlling a user interface window of the learner response application in response to inputs received from the remote terminals at the learner-response application.

14. The learner response system of claim 11 further comprising means for controlling a user interface window of the learner response application in response to inputs forwarded to the learner-response application from the presentation application.

15. The learner-response system of claim 11 wherein the learner-response application is further configured, on closure of the window following a hide event, to update a status store to indicate that the closed window was previously visible.

16. The learner-response system of claim 11 wherein the learner-response application is further configured, on receipt of an appear event at the learner-response application, to determine whether any window of the learner-response application has previously been hidden following a hide event.

* * * * *

UNITED STATES PATENT AND TRADEMARK OFFICE
CERTIFICATE OF CORRECTION

PATENT NO. : 9,785,449 B2
APPLICATION NO. : 13/348964
DATED : October 10, 2017
INVENTOR(S) : Christian Coda et al.

It is certified that error appears in the above-identified patent and that said Letters Patent is hereby corrected as shown below:

In the Claims

Claim 1, Column 15, Line 11, before the words "in the computer system" insert -- steps --

Claim 11, Column 16, Line 64, replace "of the presentation" with -- on the presentation --

Signed and Sealed this
Twenty-fourth Day of April, 2018

Andrei Iancu
*Director of the United States Patent and Trademark Office*